United States Patent
Newton et al.

(10) Patent No.: US 9,979,902 B2
(45) Date of Patent: May 22, 2018

(54) 3D DISPLAY HANDLING OF SUBTITLES INCLUDING TEXT BASED AND GRAPHICS BASED COMPONENTS

(75) Inventors: Philip Steven Newton, Eindhoven (NL); Dennis Daniël Robert Jozef Bolio, Eindhoven (NL); Francesco Scalori, Capolago (CH); Gerardus Wilhelmus Theodorus Vanderheijden, Eindhoven (NL); Henricus Fransiscus Petrus Maria Van Doveren, Eindhoven (NL); Wiebe De Haan, Eindhoven (NL); Hendrik Frank Moll, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 862 days.

(21) Appl. No.: 13/155,436

(22) Filed: Jun. 8, 2011

(65) Prior Publication Data

US 2011/0292189 A1 Dec. 1, 2011

Related U.S. Application Data

(63) Continuation of application No. 13/054,973, filed as application No. PCT/IB2009/053116 on Jul. 17, 2009, now Pat. No. 8,508,582.

(30) Foreign Application Priority Data

Jul. 25, 2008 (EP) .................................. 08161152

(51) Int. Cl.
*H04N 13/04* (2006.01)
*H04N 15/00* (2006.01)
(Continued)

(52) U.S. Cl.
CPC ............ *H04N 5/278* (2013.01); *H04N 13/007* (2013.01); *H04N 13/0048* (2013.01); *H04N 13/0066* (2013.01); *H04N 2213/005* (2013.01)

(58) Field of Classification Search
CPC ........... H04N 13/0048; H04N 13/0066; H04N 13/007; H04N 2213/005; H04N 5/278
(Continued)

(56) References Cited

U.S. PATENT DOCUMENTS

| 2004/0081434 A1* | 4/2004 | Jung | ...................... G11B 27/10 386/244 |
| 2004/0175133 A1 | 9/2004 | Kashiwagi et al. | |

(Continued)

FOREIGN PATENT DOCUMENTS

| EP | 0590498 A1 | 4/1994 |
| EP | 0735784 A2 | 10/1996 |

(Continued)

OTHER PUBLICATIONS

"White Paper Blu-Ray Disc Format", 2.B Audio Visual Application Format Specifications for BD-Rom, Mar. 2005.
(Continued)

*Primary Examiner* — Jessica M Prince

(57) ABSTRACT

A non-transitory three-dimensional image signal includes a first image component, a second component for creating a three-dimensional image in combination with the first image component, and a text component that includes text-based subtitles and/or presentation graphics-based bitmap images for including in the three-dimensional image. A shared Z-location component includes Z-location information describing the depth location of the text component within the three-dimensional image. The signal is rendered by rendering the three-dimensional image from the first image component and the second component. The rendering
(Continued)

includes rendering the text-based subtitles and/or presentation graphics-based bitmap images in the three-dimensional image. Further, the rendering of the text component includes adjusting the depth location of the text-based subtitles and/or presentation graphics-based bitmap images based on the shared Z-location component. The Z-location for both text-based and presentation-graphics-based subtitles may be the same and only needs to be stored once per stream.

18 Claims, 7 Drawing Sheets

(51) Int. Cl.
*H04N 5/278* (2006.01)
*H04N 13/00* (2018.01)

(58) Field of Classification Search
USPC .......................................................... 348/51
See application file for complete search history.

(56) References Cited

U.S. PATENT DOCUMENTS

| | | | |
|---|---|---|---|
| 2005/0008347 | A1 | 1/2005 | Jung et al. |
| 2005/0140676 | A1 | 6/2005 | Cho |
| 2007/0121005 | A1 | 5/2007 | Gutta et al. |
| 2007/0195082 | A1* | 8/2007 | Takanashi ............... G06T 15/20 345/419 |
| 2009/0142041 | A1* | 6/2009 | Nagasawa .......... H04N 13/0033 386/341 |
| 2009/0208189 | A1* | 8/2009 | Sasaki .................... G11B 27/10 386/248 |

FOREIGN PATENT DOCUMENTS

| | | |
|---|---|---|
| EP | 0905988 A1 | 3/1999 |
| EP | 1501316 A1 | 1/2005 |
| JP | 2004201004 A | 7/2004 |
| JP | 2004208014 A | 7/2004 |
| JP | 2004274125 A | 9/2004 |
| JP | 2008103820 A | 5/2008 |
| WO | 2006111893 A1 | 10/2006 |
| WO | 2006137000 A1 | 12/2006 |
| WO | 2008038205 A2 | 4/2008 |
| WO | 2008044191 A2 | 4/2008 |
| WO | 2008115222 A1 | 9/2008 |
| WO | 2009090868 A1 | 7/2009 |

OTHER PUBLICATIONS

"3D Interface Specifications", White Paper, Philips 3D Solutions.

Fehn: "Depth-Image-Based Rendering (DIBR), Compression, and Transmission for a New Approach on 3D-TV"; Proceedings of SPIE; 5291, Stereoscopic Displays and Virtual Reality Systems, May 21, 2004, pp. 93-104.

Legge et al: Psychophysics of Reading-1. Normal Vision; Vision Research. vol. 25, No. 2, pp. 239-252, 1985.

Yano et al: "Two Factors in Visual Fatigue Caused by Stereoscopic HDTV Images"; Three-Dimensional TV, Video and Display, Proceedings of SPIE, vol. 4864, 2002, pp. 157-166.

* cited by examiner

3D DISPLAY HANDLING OF SUBTITLES INCLUDING TEXT BASED AND GRAPHICS BASED COMPONENTS

This is a Continuation of U.S. patent application Ser. No. 13/054,973, filed on Jan. 20, 2011, the contents of which are incorporated herein by reference.

FIELD OF THE INVENTION

This invention relates to the creation and rendering of a three-dimensional (3D) image signal. In one embodiment, the invention provides automatic optimal positioning of subtitles on a 3D display which attenuates fatigue in the viewer.

BACKGROUND OF THE INVENTION

Currently there is a revival in interest in 3D television, this is related to recent breakthroughs in display technology which allow good reproduction of 3D video for multiple viewers. One of these is the autostereoscopic 3D lenticular display, but there are also other types of displays, such as the autostereoscopic barrier based displays and the time-multiplexed stereo displays based on rear projection technology. Typically these types of display use one of two basic video formats as an input to create a 3D impression to the viewer. The stereo based displays use time sequential interleaving and glasses to display two separate views, one for each eye, and therefore expect stereo video as an input. Examples of these are the time-multiplexed rear projection based stereo displays and this type of system is also used in 3D cinema. The main alternative to this are multi-view autostereoscopic displays, which require no glasses and often use an input format known as image+depth as an input to generate a 3D impression. More information on 3D display technology can be found in chapter 13 of "3D video communication—Algorithms, concepts and real time systems in human centered communication" by Oliver Shreer et al. (Wiley 2005).

The stereo video format is straightforward as it provides two images, one for each eye. Typically these two images are interleaved, either spatially or in a time-sequential manner and then fed into the display. The alternative format, called image+depth, is different in that it is a combination of a 2D image with a so called "depth", or disparity map. This is typically a gray scale image, whereby the gray scale value of a pixel indicates the amount of disparity (or depth in case of a depth map) for the corresponding pixel in the associated 2D image. The display when rendering the 3D image uses the disparity or depth map to calculate the additional views taking the 2D image as input. This may be done in a variety of ways, in the simplest form it is a matter of shifting pixels to the left or right dependent on the disparity value associated to those pixels. The paper entitled "Depth image based rendering, compression and transmission for a new approach on 3D TV" by Christoph Fen gives an overview of the technology.

A problem with the autostereoscopic and (time sequential based) stereo 3D displays is what is referred to as the accommodation-convergence mismatch. This is a problem in which a viewer's eyes converge on the virtual location of objects being displayed, whilst at the same time the eyes accommodate (to see the image sharp) on the surface of the display itself. This mismatch may cause headaches and other symptoms associated with motion sickness. In addition any geometrical (especially any vertical parallax), as well as electrical (brightness, contrast etc.) differences between the views for the left and right eyes can additionally cause visual fatigue. However, if the amount of disparity is kept small, that is smaller than one degree, then these problems are less severe and users can view the content without any significant problems. See "Two factors in visual fatigue caused by stereoscopic HDTV images", Sumio Yano et al. Displays 2004 pages 141 to 150 Elsevier, for more detail.

Similar to the above problems are that a problem can occur when the rendering device is displaying text such as subtitles or closed captioning. If the text is not properly positioned on the screen, which depends on the type and settings of the display, the text may appear blurred, for example owing to crosstalk between the left and the right eye views, and the viewer may feel tired. It is also the case that the blurring can impact on the readability of the text. According to E. Legge (see "Psychophysics of Reading: I. Normal Vision", Gordon E. Legge et. al. Vision Research, Vol 25, No. 2, pages 239 to 252, 1985) reading is impaired if the bandwidth of the text is below two cycles per character. Blurring is a problem with auto stereoscopic displays, as typically resolution is sacrificed to generate multiple views, and for stereo displays in general there is a problem with a suboptimal separation between the two views, which can add to blurring of the image. Furthermore according to Yano (referenced above), depth motion increases visual fatigue.

Another problem that is foreseen, is that viewers can adjust the amount of disparity and relative position of the depth plane in a 3D television (through for example some buttons on their remote control). These adjustments mean that the text may become blurred, as it moves away from a depth neutral position, or increases in "depth" such that it causes visual fatigue.

United States of America Patent Application Publication US 2005/0140676 discloses a method for displaying multi-level text data in three-dimensional map. In the system described in this Publication, a three-dimensional map is displayed on a screen, and text data with different levels of density are displayed according to distances from a view point of the displayed three-dimensional map to nodes where the text data will be displayed, thereby improving readability of the text data. Further, it is possible to display the text data by locally adjusting the density of the text data on the screen. The three-dimensional map is displayed on the screen of a display panel by converting map data with two-dimensional coordinates into those with three-dimensional coordinates by means of a perspective projection method. Text data to be displayed together with the three-dimensional map are converted into those in a three-dimensional coordinate system with an origin defined by the view point of the three-dimensional map. The converted text data are projected on a two-dimensional plane to be converted into those with screen coordinates. Then, distances from the view point of the displayed three-dimensional map to the nodes where the text data will be displayed are classified. The classified distances are determined for the converted text data with the screen coordinates. Text data of levels corresponding to the determined distances are displayed on the screen of the display panel on which the three-dimensional map is displayed.

While in the context of the representation of a three-dimensional map on a two-dimensional display device, the handling of the text data according to this publication is positioned and scaled in a meaningful manner for the user, it does not address any of the issues identified above, relating to the display of text in a three-dimensional display device.

SUMMARY OF THE INVENTION

It is therefore an object of the invention to improve upon the known art. According to a first aspect of the present invention, there is provided methods and devices where the Z-location for both text-based and presentation-graphics-based subtitles is the same and only needs to be stored once per stream (i.e. per subtitle language). This shared Z-location of subtitles may be stored on a tangible computer readable medium, e.g., on the Blu-ray Disc (BD).

According to a further aspect of the present invention, there is provided a method of creating a three-dimensional image signal comprising receiving a first image component, receiving a second component for creating a three-dimensional image in combination with the first image component, receiving a text component for including in the three-dimensional image, receiving a data component comprising location information describing the location of the text component within the three-dimensional image, and creating a three-dimensional image signal comprising the first image component, the second component, the text component, and the data component.

According to a further aspect of the present invention, there is provided a device for creating a three-dimensional image signal comprising a receiver arranged to receive a first image component, a second component for creating a three-dimensional image in combination with the first image component, a text component for including in the three-dimensional image, and a data component comprising location information describing the location of the text component within the three-dimensional image, and a multiplexer arranged to create a three-dimensional image signal comprising the first image component, the second component, the text component, and the data component.

According to a further aspect of the present invention, there is provided a method of rendering a three-dimensional image signal comprising receiving a three-dimensional image signal comprising a first image component, a second component for creating a three-dimensional image in combination with the first image component, a text component for including in the three-dimensional image, and a data component comprising location information describing the location of the text component within the three-dimensional image, rendering a three-dimensional image from the first image component and the second component, the rendering including rendering the text component in the three-dimensional image, the rendering of the text component including adjusting three-dimensional parameters of the three-dimensional image in the location of the rendered text component.

According to a further aspect of the present invention, there is provided a device for rendering a three-dimensional image signal comprising a receiver arranged to receive a three-dimensional image signal comprising a first image component, a second component for creating a three-dimensional image in combination with the first image component, a text component for including in the three-dimensional image, and a data component comprising location information describing the location of the text component within the three-dimensional image, a display arranged to render a three-dimensional image from the first image component and the second component, the rendering including rendering the text component in the three-dimensional image, the rendering of the text component including adjusting three-dimensional parameters of the three-dimensional image in the location of the rendered text component.

According to a further aspect of the present invention, there is provided a three-dimensional image signal comprising a first image component, a second component for creating a three-dimensional image in combination with the first image component, a text component for including in the three-dimensional image, and a data component comprising location information describing the location of the text component within the three-dimensional image.

According to a further aspect of the present invention, there is provided a computer program product on a computer readable medium for creating a three-dimensional image signal, the product comprising instructions for receiving a first image component, receiving a second component for creating a three-dimensional image in combination with the first image component, receiving a text component for including in the three-dimensional image, receiving a data component comprising location information describing the location of the text component within the three-dimensional image, and creating a three-dimensional image signal comprising the first image component, the second component, the text component, and the data component.

According to a further aspect of the present invention, there is provided a computer program product on a computer readable medium for rendering a three-dimensional image signal, the product comprising instructions for receiving a three-dimensional image signal comprising a first image component, a second component for creating a three-dimensional image in combination with the first image component, a text component for including in the three-dimensional image, and a data component comprising location information describing the location of the text component within the three-dimensional image, rendering a three-dimensional image from the first image component and the second component, the rendering including rendering the text component in the three-dimensional image, the rendering of the text component including adjusting three-dimensional parameters of the three-dimensional image in the location of the rendered text component.

Owing to the invention, it is possible to improve the readability of text such as subtitles on a 3D display. The improved readability is based on the fact that additional parameters are sent to the 3D display such that the display can treat the part of the image that contains the subtitles differently from the rest of the image. The display then can ensure that the subtitles are positioned automatically in the best way with regards to depth, sharpness and general readability of the text. The application of the invention is applicable to systems such as a Blu-Ray disc player and a DVD or HD-DVD player that is connected to a 3D display, and that is showing 3D content and associated subtitles. It will be clear to the skilled person that the image signal may further be obtained partially or completely over a digital network, such as the Internet, or an intranet.

Text, especially subtitles, should be displayed within a limited range of depth from the screen and they must not change in depth during the entire presentation. If the depth of the text must remain constant, then this also poses a problem for positioning, as the depth of the video may vary and therefore could occlude parts of the text during certain scenes. To summarize, the following factors must be taken into account when displaying subtitles or closed captioning on a 3D stereoscopic display, the amount of disparity should be smaller than one degree, the bandwidth of the text should stay above two cycles per character, the text must remain at a constant depth relative to the screen, and the text should not by obscured by video objects.

These conditions can be met by the improved system according to the invention. Controlling the amount of disparity can be done by adjusting that part of a "depth" map that relates to the location of the subtitles or closed captioning. Some displays require a stereo input, in those cases it will be harder to control the amount of disparity in the player, but it is still possible.

To meet the bandwidth constraints, the player must ensure that the resolution of the text is high enough, that ghosting is kept to a minimum and that the speed of the moving text is not too high. To meet these factors the playback device must send the subtitles or closed captions in a resolution that is sufficient for the display, and must adjust the depth such that ghosting is minimized. This typically means that the depth of the text should be kept neutral (as close as possible to the screen). This, however, can cause a problem as parts of the video may occlude parts of the text as the depth of the video changes dynamically. This is solved by dynamically adjusting the depth of the text to ensure that it remains in front. However this means that the text would vary in depth, which according to Yano can cause visual fatigue. By transmitting the information about the location of the text, and adjusting the 3D parameters of the 3D image in the location of the text, these problems are overcome.

Although preferably the depth of the text should be fixed for longer periods of time, variations may be allowed e.g. in order to achieve particular 3D effects.

Advantageously, the step of creating a three-dimensional image signal comprises including the text component in the first image component. The text component (for example a subtitle) can be included directly in the first image component, and does not need to be transferred as a separate component. The receiving apparatus that is going to render the 3D image can still control the 3D display parameters in the region of the subtitle, even if that subtitle is embedded in the first image component of the signal.

Preferably, the step of creating a three-dimensional image signal comprises creating a single image frame comprising the first image component, the second component, the text component and the data component. All of the components in the signal can be combined into a single image frame, with the different components of the signal occupying different parts of the image frame. This is a convenient method of combining the elements that make up the signal, and can be used to take advantage of existing standards such as HDTV, which support a relatively high frame resolution. A component such as the data component, which defines the location of the text component within the ultimate signal, can be included in a header of the image frame, rather than within the actual image data of the frame.

Ideally, the step of creating a three-dimensional image signal comprises including background information for each of the first image component and the second component. The quality of the end result can be improved, if the output of the rendering device also contains background information. This allows the positioning of the subtitles to be adjusted, based on the data in the background information, to place the subtitles in the part of the 3D display area that has a relatively low amount of interest.

Preferably, the step of adjusting the three-dimensional parameters of the three-dimensional image in the location of the rendered text component comprises reducing the perceived depth of the three-dimensional image in the location of the rendered text. The rendering device can adjust the perceived depth of the 3D image in the location of the subtitles by overriding the requested depth, for example as stated in a depth map. In the specific region of the 3D display device that will actually contain the subtitles, then the perceived depth of the displayed content can be reduced, in order to attenuate any strain on the viewer's eyes.

Advantageously, the step of adjusting three-dimensional parameters of the three-dimensional image in the location of the rendered text component comprises reducing the number of views of the three-dimensional image in the location of the rendered text. By reducing the number of views that are shown by the 3D display device, ghosting or blurring of the text can be reduced. Furthermore in a lenticular display with a locally switchable lens configuration the lenses can be switched off in the part of the display where the subtitles are located. This can result in a clearer image being displayed in that part of the 3D image that contains the subtitles, with the corresponding decrease in the strain placed upon the eyes of the viewer.

Ideally, the step of adjusting three-dimensional parameters of the three-dimensional image in the location of the rendered text component comprises maintaining the disparity of the three-dimensional image below a predetermined threshold in the location of the rendered text. A specific threshold, such as one degree, can be set as a limit on the amount of disparity allowed in the region of the 3D image that contains the subtitles. This will assist the viewer to perceive the subtitles without unduly straining their eyes, as the reduction in disparity will make the viewing more comfortable for the viewer of the 3D display device.

BRIEF DESCRIPTION OF THE DRAWINGS

Embodiments of the present invention will now be described, by way of example only, with reference to the accompanying drawings, in which like numerals are used to indicate like elements or functions.

DETAILED DESCRIPTION

Figure 1:
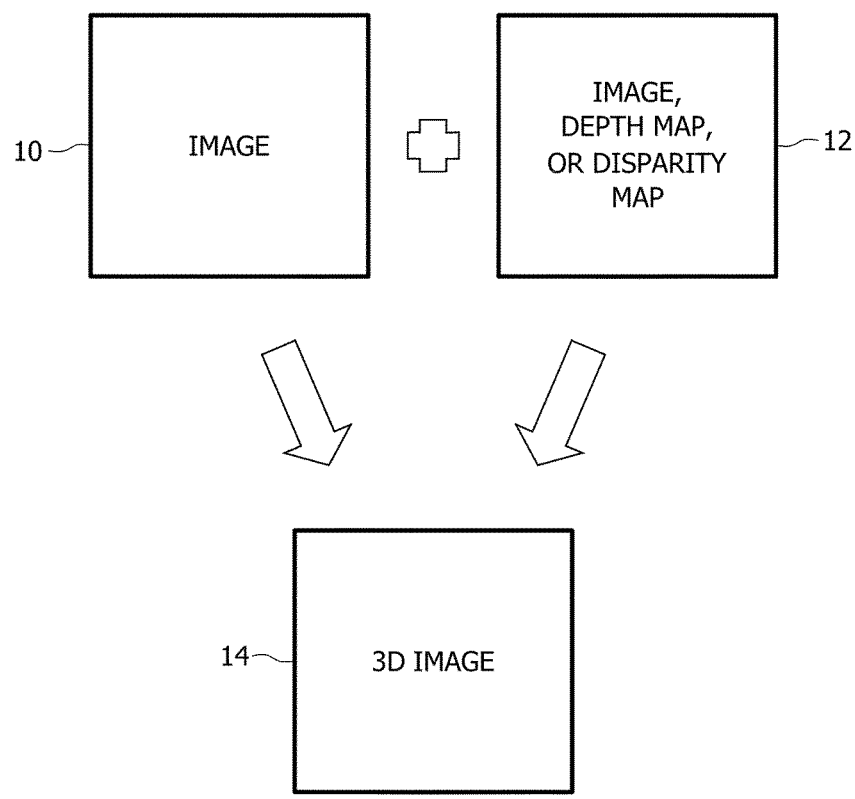
FIG. 1 is a schematic diagram illustrating the creation of the 3D image.

The creation of a three-dimensional image is illustrated schematically in FIG. 1. Essentially, whether the final rendering display device is autostereoscopic, or runs on stereo pairs (requiring the user to wear special glasses), the process is the same. A first image component 10 and a second component 12 are provided for creating a three-dimensional image 14. The second component 12 in combination with the first image component 10 are processed together to make the final output 14. In all systems, the first image component 10 is a conventional two-dimensional image frame of any suitable standard. In the stereo pair system, the second component 12 is also an image, and in the autoseteroscopic systems, the second component 12 is a depth map, or a disparity map.

It is important to understand that the final output 14 is not necessarily a single frame. For example, in the stereo pair system (where the image 10 is for the left eye, and the image 12 is for the right eye), then these two components 10 and 12 may be shown sequentially. In non-time sequential autostereoscopic systems, the image 10 and the depth map 12 are used to create multiple similar views from the image 10, with the depth map being used to generate the changes to the image 10 necessary to make the individual views. These views are then merged into a single frame 14. For example, the ultimate rendering display device may be controlled to show four individuals views, all generated from the same image 10. These views are then spliced together in strips, each having a resolution that is one quarter of the resolution of the display device.

The first image component 10 can comprise, for example, a two-dimensional array of pixel elements/an image comprising, for example, RGB or YUV information, representing a view of a scene, as would be the case for stereo-view content, multi-view content or image+depth content. As mentioned above, the second component 12 can be a two dimensional array of pixel elements/an image. In case of stereo-view contents or multi-view contents this can be a further view of the same scene, whereas in case of image+depth content this could be a so-called disparity/depth map comprising disparity or depth information. The image output 14 may comprise a video image signal, for example using multiple frames representing one or more scenes over time.

Figure 2:
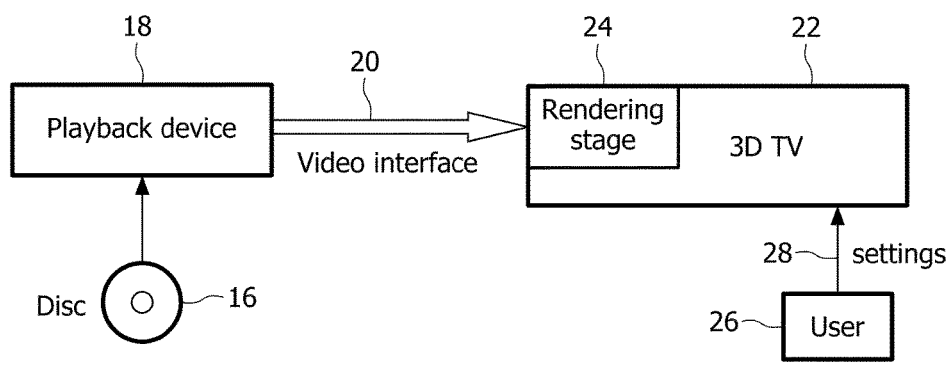
FIG. 2 is a schematic diagram of a 3D playback system.

FIG. 2 illustrates a 3D playback system, where a disk 16 is provided which carries the first and second components 10 and 12 for a 3D film, for example. The disk 16 could be a Blu-Ray standard DVD, for example. The disk 16 is played by a playback device 18, such as a Blu-Ray DVD player. A video interface 20 is used to communicate the components 10 and 12 to a 3D television 22. The television 22 includes a rendering stage 24, which is processing the components 10 and 12 in real-time to generate the 3D output 14 (as per FIG. 1 discussed above). The user 26 is watching the rendering display device 22, and can supply user settings 28 to the device 22, via a suitable user interface and remote control device (not shown).

In such systems, the use of subtitles (or indeed any text such as menus) is supported by the playback device 18. For example, it is conventional for the disk 16 to include subtitles such as a foreign language subtitles within data sections of the information stored on the disk 16. These can be selected by the user via an on-screen menu, prior to playback being started of the actual film content on the disk 16. These subtitles are then displayed by the display device 22, overlaying the 3D content being rendered. As discussed above, in the review of the prior art, in many situations, the display of subtitles in a 3D display system may cause viewer eye strain and tiredness. The system of the present invention provides a method of showing the subtitles (or indeed any text) in such a manner that the problems of the prior art will be ameliorated.

The solution provided is to allow the display 22 to identify the text (for example subtitles) in the incoming video stream and so treat the text in a different manner from the rest of the video signal. The display 22 could, for example, ensure that the text remains in front of the video, or compress and push back the depth of the video signal to ensure that the text is not protruded (as described in International Patent Application Publication WO 2008/038205). Additionally, the display 22 may provide a section of the screen that is specifically designed to show text, either by being switch-able, having a different lens configuration (in case of a lenticular display), by supporting fewer views for example. As the readability of text on a 3D autostereoscopic display is a problem that is almost inherent to the autostereoscopic display technology, there is an expectation of further, currently unforeseen improvements in the display which could benefit from being able to identify the subtitles in the incoming video signal.

One way of sending the text for subtitles separately to the display is by transmitting the text as closed caption information which is included in line 21 of the analogue video for NTSC, used in Europe (PAL) for Ceefax or Teletext. However closed caption information is currently not supported when transmitting high-definition video over HDMI. Currently to resolve this, the playback devices such as DVD or Blu-Ray disc players decode the closed caption information located in the MPEG stream and overlay this on top of the video before transmitting to the display. So to use this solution would require extending the HDMI specification to include transmission of closed caption information. It will be clear to the skilled person that the above may also apply to other digital display interfaces.

Another solution is to provide a bi-directional communication link between the playback device 18 and the display 22, such that when the user adjusts the depth settings in the display 22, the playback device 18 is informed of this change. As a result the playback device 18 can adjust the positioning of the subtitles. The preferred embodiment is to allow the playback device 18 to handle the positioning and overlay of the subtitles onto the video and to indicate to the display 22 that subtitles are present and where the subtitles are located. The display 22 can then make sure that the "depth" value associated with the subtitles is mapped onto a depth that is most optimal for that particular display 22 and associated user settings 28. This has the added advantage that the display 22 does not require a subtitle or closed caption decoder in the rendering stage.

In one embodiment, the improvement of the system is achieved whereby the player device 18, as shown in FIG. 2, adjusts the positioning of subtitles, such that the text is in front of the video, whilst keeping the amount of disparity below one degree. Preferably, the player device 18 inserts into the output stream metadata information that identifies to the display device 22 if and where subtitles are located with regards to x, y and z ("depth") position in the projection volume of the display. In this case, the rendering stage 24 in the display device 22 adjusts the positioning of the subtitles in the projection volume of the display, dependent on the aforementioned metadata information and on the user preferred settings 28 (with regards to amount of disparity and relative position), whilst maintaining the positioning such that ghosting is kept minimal and the amount of disparity remains below one degree. Additionally, the display 22, if so equipped, positions the subtitles on to a special part of the display surface which is switchable between 2D and 3D, or which supports less ghosting and a higher optical resolution (for example by supporting fewer views, or a limited amount of disparity).

In one embodiment, the text component 30 is substantially flat, and/or when a depth range is associated with the text 30 then that depth range is limited by a threshold, such that the disparity between respective views is limited to a specific range, that may be a pre-determined range, such as for example one to two pixels. In a preferred embodiment wherein the text component 30 is substantially flat, the text component is a text-based text component rather than a bitmap-based text component; thereby enabling a particularly compact representation of the text component 30.

Figure 3:
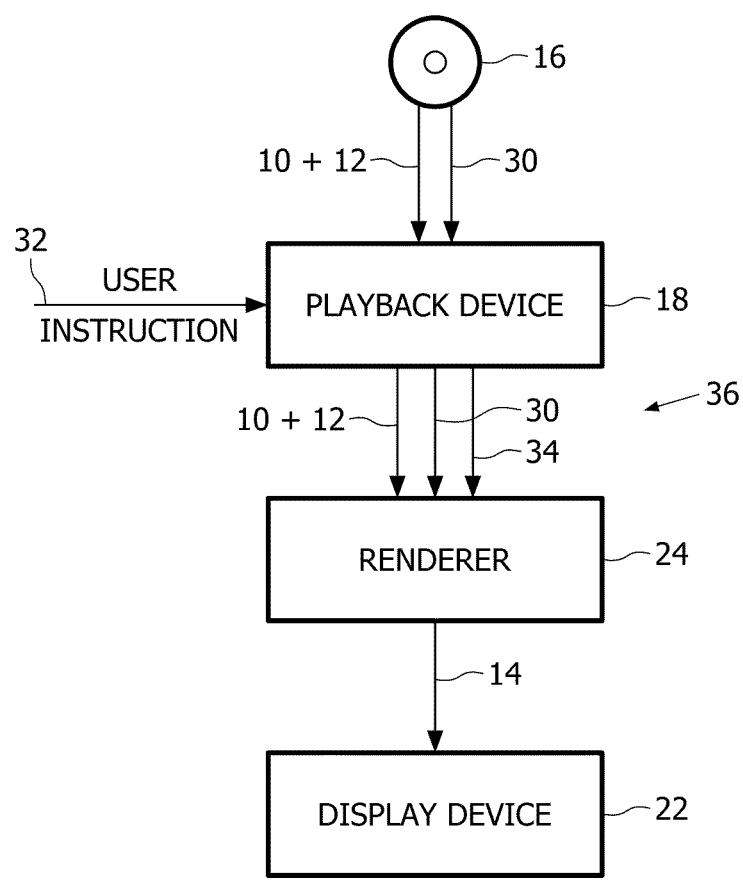
FIG. 3 is a schematic diagram showing content and data flow in the 3D playback system.

The content and data flow in the system of FIG. 2 is illustrated in FIG. 3. The disk 16 contains the first image component 10 and the second component 12, plus text component 30, being subtitles. A user instruction 32 is received by the playback device 18, which indicates that the user wishes to have the subtitles 30 displayed along with the 3D film that they are about to watch. The playback device 18 provides the components 10 and 12, with the subtitles 30 and a data component 34 which comprises location information describing the location of the text component 30 within the ultimate 3D image 14, to the renderer 24. The playback device includes a receiver for receiving the various components from their respective sources and a multiplexer for combining these four elements 10, 12, 30 and 34 into a three-dimensional image signal 36, which is received by the renderer 24.

The subtitle information 34 may be sent to the renderer 24 separate from the image data 10 and 12, i.e. maybe not in an active image area but in a header, or in data islands, or in a part of the frame that does not contain image data. For example it may be that there is sent a video stream at twice the normal frame rate, where one frame contains the image data 10 and 12 and the other frame contains depth (optionally also including de-occlusion) information and also contains a special area for the subtitles 30 and the position information 34.

The renderer 24 is then arranged to render the three-dimensional image 14 from the first image component 10 and the second component 12, the rendering (including rendering the text component 30 in the three-dimensional image 14), the rendering of the text component 30 including adjusting one or more three-dimensional parameters of the three-dimensional image 14 in the location of the rendered text component 30. The text component 30 itself may be totally unaltered by the adjustments made by the renderer 24. The important factor is that the renderer will adjust the parameters of the parts of the image 14 that are being displayed in the location of the text 30. This may comprise reducing the perceived depth of the 3D image at this area of the image 14, or may comprise reducing the number of views (in an autostereoscopic display device) or a combination of two or more adjustments. It is also possible for the renderer 24 to include not only changing the depth of the area where the subtitles 30 are to be displayed, but to also include an offset, in order to move the entire depth range forward or backward. This offset can be controlled separately for the subtitles 30 from the rest of the image data 14.

In the embodiment using an autostereoscopic display, the second component 12 comprises a depth map, and the method of rendering the 3D image 14 can further comprise scaling the second component 12 prior to rendering the three-dimensional image 14, in order to enable the placement of the text component 30 at the location as specified by the data component 34. In this case the renderer may further receive a recommender component comprising a recommended scaling of the second component 12, such that the location information can remain the same for multiple consecutive images. As a result of the use of this recommender component, it becomes possible to maximize the depth of the scene when subtitles/graphics are switched off and when subtitles/graphics are switched on, to use a predetermined scaling component tuned to the image signal, for rendering the content including subtitles/graphics.

Figure 4:
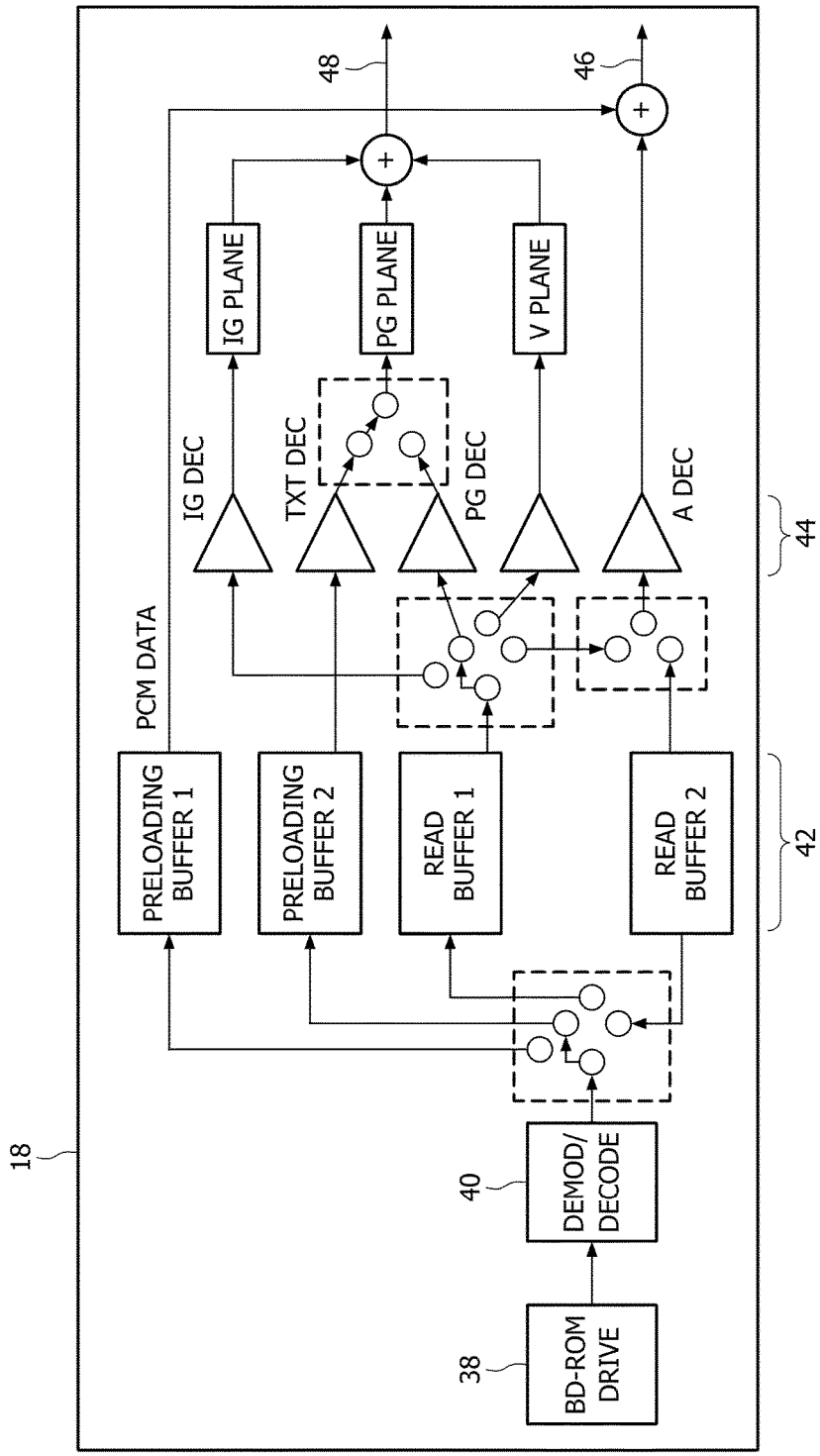
FIG. 4 is a schematic diagram of a playback device of the 3D playback system.

An example of a playback device 18 is shown in FIG. 4, which is a Blu-Ray disc decoder 18 showing decoding and the use of presentation planes. A ROM drive 38 receives the disk 16 and reads content that is demodulated and decoder by the component 40. A set of parallel buffers 42 store different components of the decoded signal, and these pass through a set of parallel decoders 44 to provide the output to be displayed by the display 22, being the standard video 46 and the overlay content 48 (being subtitles and menus and so on).

Figure 5:
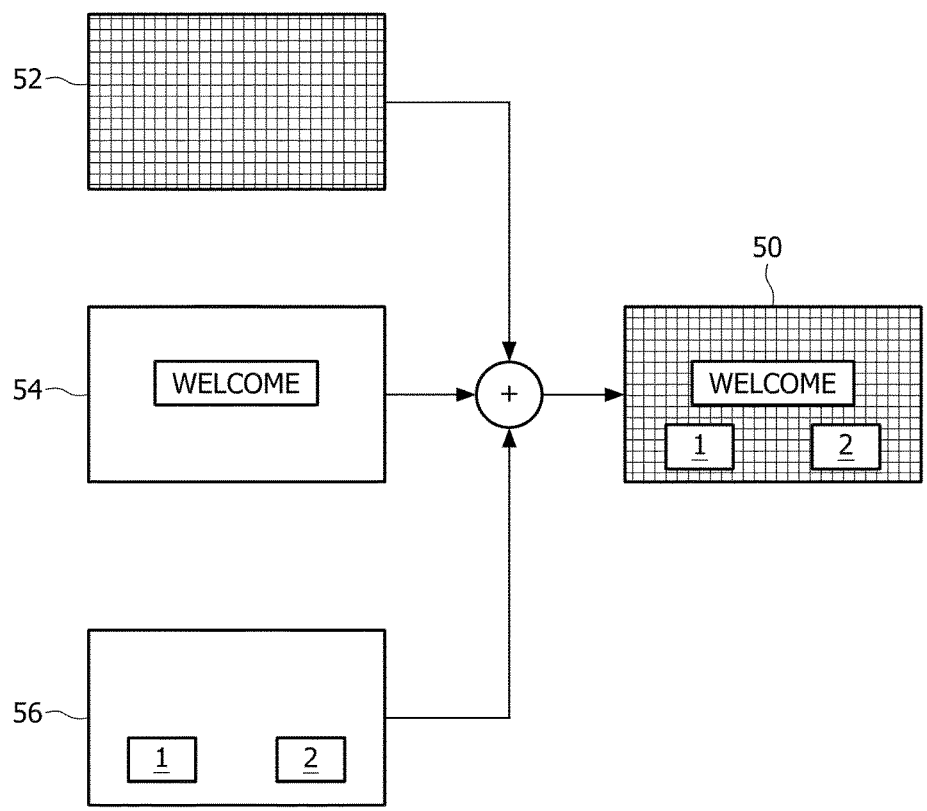
FIG. 5 is a schematic diagram showing the use of planes in creating an output.

In the Blu-Ray system, disc subtitles may either be bitmap based or based on text and related fonts and additionally the player 18 provides support for closed caption information. Technically, both systems are somewhat similar, although closed captions often provide more information and are provided specifically for the hearing impaired. Both text based subtitles as well as bitmap based and closed captions are decoded and presented on to one of the presentation planes in Blu-Ray disc. FIG. 4 shows the decoder 18 and the planes, showing an example of text combined with video. Text is always presented on the presentation graphics (PG) plane; this plane is overlaid in the playback device 18 onto the video (planes) and presented as one combined presentation onto the output. FIG. 5 shows an example of a combined presentation 50. This output 50 is constructed from a main movie plane 52, a presentation plane 54 and an interactive plane 56. The output 50 as shown in FIG. 5 is sent to the display 22 over the video interface 20 (as shown in FIG. 2). In the preferred embodiment, the playback device 18 is capable of sending additional information to the display 22 which contains the 3D data 34, in addition to the output 50. This enables the 3D display 22 to show a 3D representation of the combined video, text and graphics output of the playback device 18.

Figure 6:
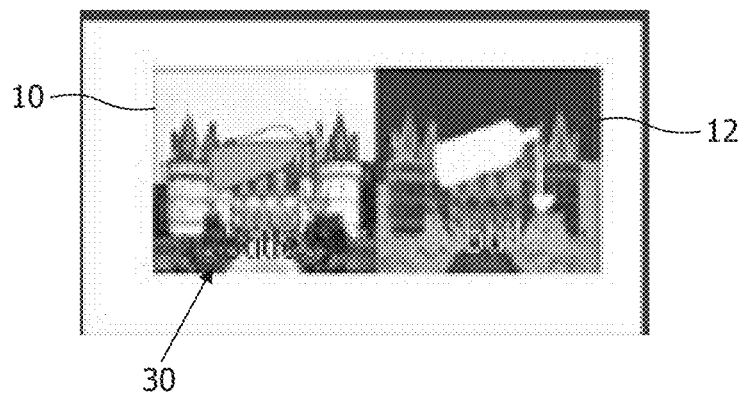
FIG. 6 is a schematic diagram of 3D image signal.

FIG. 6 shows an example of such a combined output for sending to the 3D display 22. The 3D system being used is an example of an image and depth output. The first image component 10 and the second component 12 (being a depth map) will be combined to make the 3D image by the display device 22. The text component 30 is included within the first component 10, and indeed the entire content (the three components 10, 12 and 30) can be constructed as a single high-definition frame.

Figure 7:
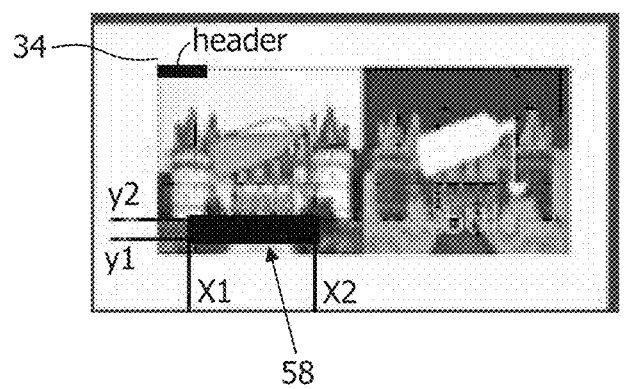
FIG. 7 is a schematic diagram of an enhanced 3D image signal.

FIG. 7 shows the addition of a header indicating the location of the subtitles 30. The header comprises a data component 34 which comprising location information 58 describing the location of the text component within the three-dimensional image, here shown as x and y co-ordinates, although a z component will also be present by virtue of the content of the depth map 12. The header allows the ultimate rendering device to make adjustments to the 3D output to take into account the presence of the subtitles 30.

The additional parameters that are transmitted, may be contained in the header above the image data as described in "3D interface Specifications—white paper", Philips 3D solutions, available on the World Wide Web at business-sites.philips.com/shared/assets/global/Downloadablefile/Philips-3D-Interface-White-Paper-13725.pdf, in line with International Patent Application Publication WO 20061137000A1, or for example in the data island of the HDMI standard. These parameters consist of an indication as to whether the subtitles are present and their location in the input video as shown in FIG. 7. The display device 22 can then ensure that the disparity of the part of the image located at this position does not exceed beyond one degree and remains constant, even if the user, through an input command, increases the amount of disparity shown by the display device 22.

Figure 8:
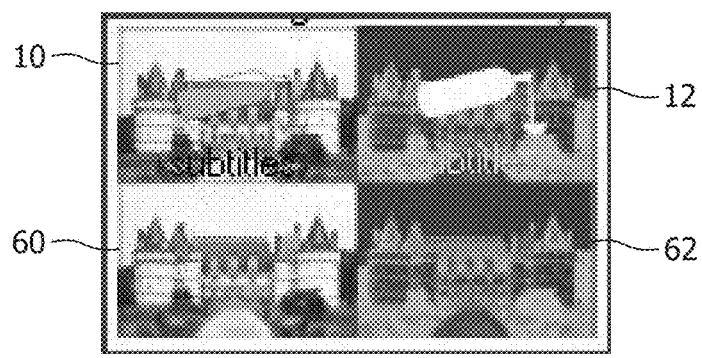
FIG. 8 is a schematic diagram of a further enhanced 3D image signal.

The quality of the end result can be improved, if the output of the player 18 also contains occlusion or background information. This is shown in FIG. 8. To avoid artifacts, the subtitles 30 should be located outside the most active part of the image, for example at the top or bottom. FIG. 8 shows an image, depth and background output format. Background components 60 and 62 are provided for the first image component 10 and the second component 12, respectively.

Figure 9:
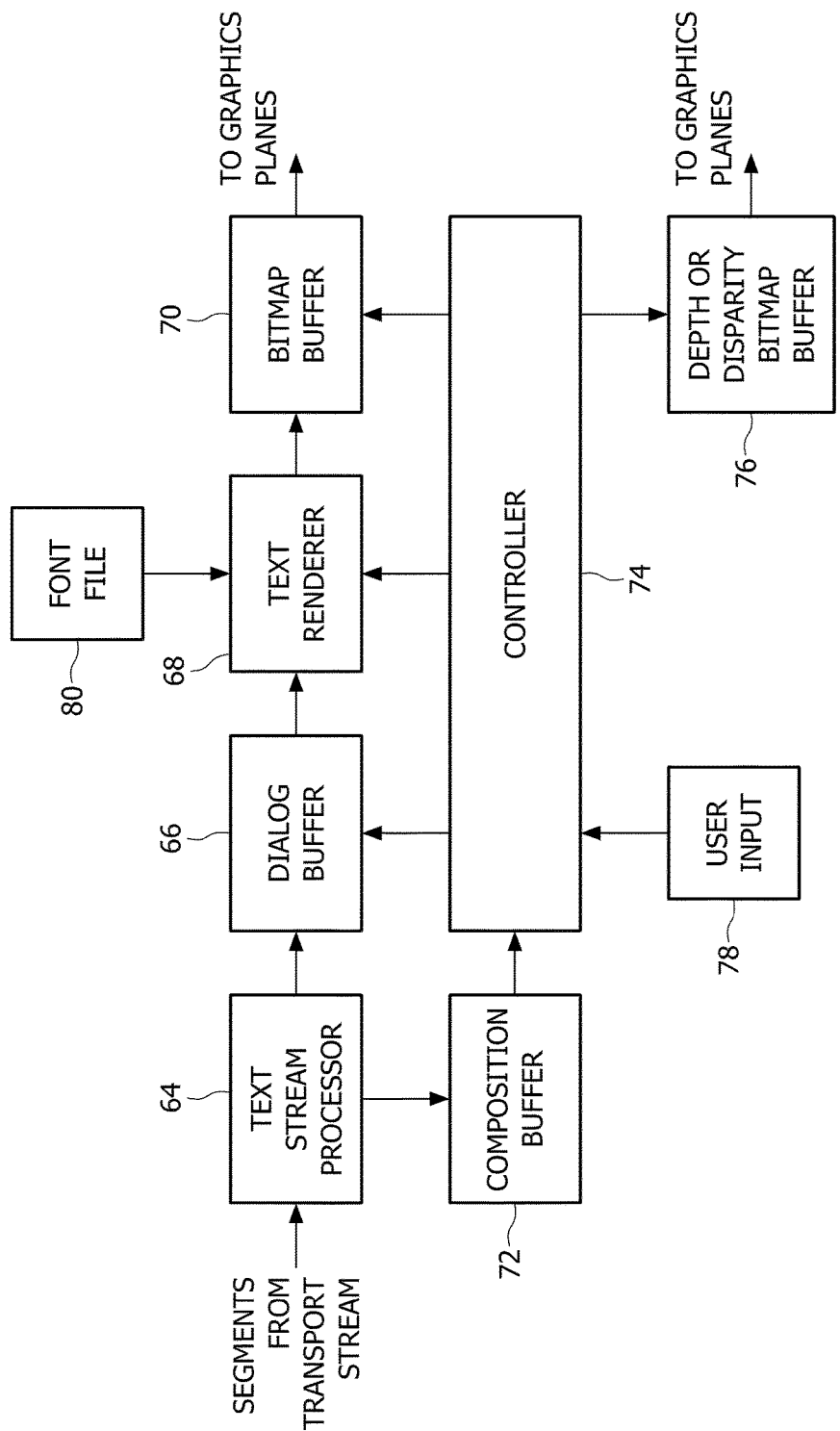
FIG. 9 is a schematic diagram, similar to FIG. 4, of a second embodiment of a playback device.

The location of the subtitles 30 within the final image 14 can include a reference to the Z location of the subtitles. For example, it is possible to extend the Blu-Ray disc text subtitle decoder model and associated composition information (specifically the dialog style set, section 9.15.4.2.2) with a Z position such that the original content author can indicate where in the Z direction projection space of the 3D display the subtitles should be positioned. In the Blu-Ray disc standard there is defined a text subtitle decoder and related stream. The text subtitle decoder is defined in section 8.9 and consists of various processing elements and buffers. FIG. 9 shows a simplified picture of the decoder model, extended for handling 3D images with an associated text component such as a subtitle 30.

FIG. 9 shows a 3D text subtitle decoder model. From left-to-right text subtitle segments enter the decoder 18 where they are processed and decoded by the text stream processor 64. The decoded text data is placed in the dialog buffer 66, whilst the decoded text subtitle composition information is placed in the composition buffer 72. A controller 74 interprets the composition information and applies this to the text after it has been rendered by the text renderer 68 (using a font file 80) and places the result in the bitmap buffers 70. At the final step, the bitmap images are composited by the player 18 onto the appropriate graphics planes. User input 78 is also received by the controller 78, which may affect, for example, depth parameters of the display.

In addition to text-based subtitles, Blu-ray Disc (BD) also supports subtitles based on bitmap-images, the so called Presentation Graphics (PG). Likewise, the Z-position of the PG-subtitles need to be specified on the disc, preferably near the already defined X, Y-position information. As the latter are stored in the composition_object( ) structure, it is logical to extend this with the Z-position of the subtitles, e.g. by using the reserved bits starting at offset bit 26. The term text component as used throughout the present application is used to refer to text-based subtitles and/or such bitmap-images.

The decoder 18 has been extended with an additional bitmap buffer 76 which holds the depth or disparity map that indicates where in the Z-direction the text subtitle 30 should be located. The depth or disparity information can be contained in the dialog style set as defined in the Blu-Ray specification. One method for achieving this is for the dialog style set to be extended with a region_depth_position. The region_depth_position is an 8 bit field with values between 0 and 255, but in the future this may be extended. The controller 74 determines the correct depth or disparity map pixel values based on the value of the region_depth_position field. The translation of this value to a color value for the depth or disparity map is dependent on the 3D metadata that is carried in the 3D_metadata field in the playlist or which is carried in the MPEG-2 Program Map Table (ISO/IEC 13818-1). The syntax of this information is defined by MPEG in ISO/IEC 23002-3.

Figure 10:
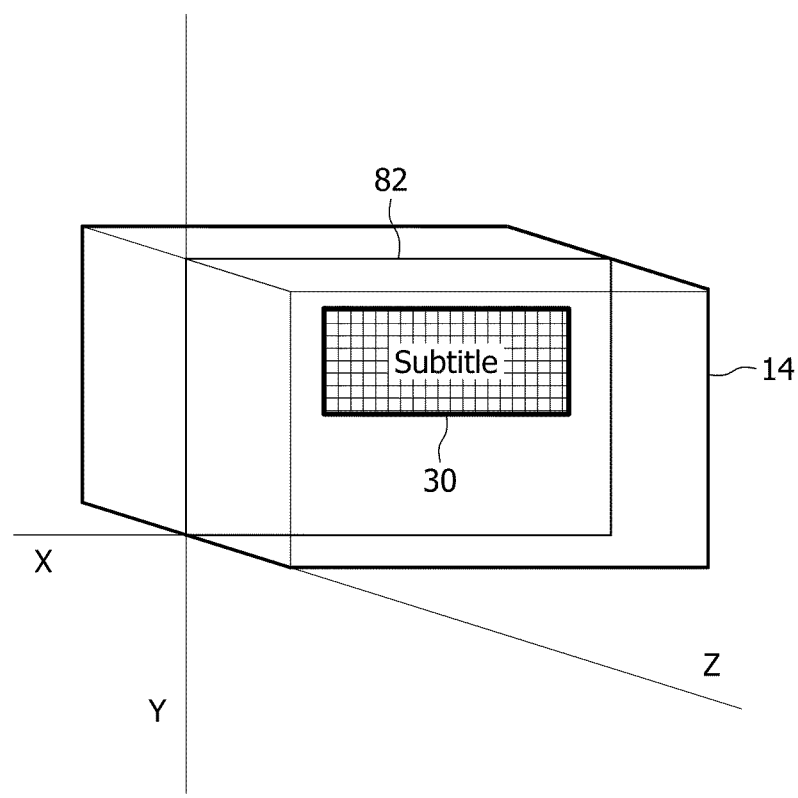
FIG. 10 is a schematic diagram of text placed in a 3D image.

The Z position of the subtitles 30 is then provided to the renderer 24, which can take into account the Z position of the subtitles 30, when rendering the 3D image 14, for display by the 3D display device 22. FIG. 10 shows an example of a 3D space with the positioning of the depth through the use of the region_depth_position field. The image 14 includes the subtitle 30, which is placed in the plane 82. The plane 82 indicates the position in space at zero depth, the other lines indicate the three directions x, y and z in 3D space.

In addition to having included a depth region to indicate the region in space where the subtitles should be positioned, it is also possible to go even further by adding a separate depth for the text 30 itself, and to specify the region not as a plane but as a cube in space. This could be done, for example, by extending the region position fields in the dialog style set with a region_depth position and a region_depth_length. The same can be done for the text box positions that indicate the exact location of the text inside the region.

The font file 80 can be used to include an embossed font style, as it has been shown that this improves readability of the resulting text in 3D. The font styles are described in Table 9-75 of the Blu-Ray specification, alternatively the font outline thickness field is used for this reason, which is table 9-76 of the Blu-Ray specification. Both these tables have reserved fields at the end that could be used for this purpose. The embossed font style would be value 0x08 in table 9-75 and for the embossed font outline thickness this would be value 0x04 in table 9-76.

Advantageously, the Z-location for both text-based and PG-based subtitles is the same and only needs to be stored once per stream (i.e. per subtitle language). It is clear to the skilled person that there are many alternative locations on the BD disc for storing this shared Z-location of subtitles. Examples of such alternative locations are described below. The document "White paper Blu-ray Disc Format 2.B Audio Visual Application Format Specifications for BD-ROM March 2005" available via internet resource available on the World Wide Web at blu-raydisc.com/Assets/Downloadablefile/2b_bdrom_audiovisualapplication_0305-12955-15269.pdf, which is hereby incorporated by reference, contains further background information on the BD format and the structures in the format referenced below.

The shared Z-location of subtitles could for example be stored in a new table defined as extension data of the PlayList. The PlayList in the BD specification is a list that indicates a sequence of AudioVisual content items that together form the presentation of a title, such as a Movie. This Playlist structure provides a mechanism for future extensions through its extension data. The "Z" location of the subtitles plane (PG-plane) for the various language streams can be included there in a new table called the offset_metadata table. Table 1 shows the details of this table.

Furthermore in the case when a PlayList contains PlayItems that allow playback of stereoscopic multi-angle video data then the "Z" location for overlay of graphics such as subtitles may be different for every stereoscopic multi-angle video clip. Therefore the offset_metadata should also allow different "Z" locations for every stereoscopic multi-angle video clip referenced in the PlayItem. In such a case the offset_metadate table contains different "Z" locations for overlay of subtitles for every stereoscopic multi-angle video clip. These different "Z" locations may then be referenced with an identifier for every multi-angle video clip that requires a different "Z" location for overlay of subtitles. Table 2 shows an example of how table 1 can be extended to support different "Z" locations for different stereoscopic multi-angle video clips, The StreamID and AngleID references in table 1 and 2 serve as unique identifiers of respectively a elementary stream on the disc (containing subtitle content) and a (multi)-angle stereoscopic video clip.

Instead of using extension data it is also possible define a new PlayList table structure specifically for playback of 3D streams and include the "Z" location parameters there. Problems with playback on legacy players can be avoided by providing a new index table (a list of user selectable titles) on the disc or using the extension data of the index table that lists the titles playable only by a 3D enabled player.

Alternatively if the information should be provided in an existing table in the PlayList then it can be included in the STN_Table_SS( ). This is a table that lists the video and -graphics streams associated to a PlayItem. Per PlayItem it contains a loop with stream coding information (attributes) for every text and bitmap subtitle stream. We propose to include the "Z" location information in the same loop as the stream attribute information.

A problem with using the PlayList to store the "Z" parameters for every subtitle stream is duplication of data. Multiple PlayLists may reference the same subtitle streams. This limitation can be overcome by including the "Z" location metadata in the Clip information file. The Clip information file lists metadata related to the MPEG Transport Stream that contains the A/V content and the subtitle streams. The Clip information file can be extended with a table similar to what is proposed for the PlayList extension data. However as the Clip information file is associated to an MPEG Transport Stream it lists the subtitle Elementary Streams by Packet Identifier (PID). Therefore we propose that the "Z" location metadata is provided for every PID listing that indicates the PID of a subtitle stream.

Alternatively instead a defining a new table in the extension data, the "Z" location is stored in the ProgramInfo table in the clip information file. The ProgramInfo table provides a list of Elementary Streams that together form a presentation of A/V content. It contains similar information as the PMT table defined in MPEG systems ISO/IEC 13818-1. We propose that for every Elementary Stream that contains subtitle information we provide "Z" location metadata. The metadata can be included in the ProgramInfo itself or in a subtable of the ProgramInfo table, the StreamCodingInfo table. It provides details on the coding and language codes for the subtitles stream present in the Transport Stream. The StreamCodingInfo table also has some reserved fields, we propose to use these reserved fields to carry the "Z" position parameters associated to the subtitle stream for a particular language code.

If the "Z" location is required to change every few seconds then the CPI( ) table in the clip information file should be used. The CPI information is a table that lists the entry points into the video streams for trick play. The listings of entry points could be extended with a "Z" location parameter that indicates per entry point the location in "depth" of where to overlay any graphics such as subtitles.

Alternatively if the "Z" location information is frame accurate then it should be included in the in the SEI messages of the dependent video stream. SEI (Supplemental Enhancement Information, called sign messages) are packets embedded in an MPEG Elementary Stream that carry parameters that can be used by a decoder to aid in decoding the content. MPEG also allows embedding private user data SEI messages; these will be ignored by standard decoders but can be used by a modified decoder. A user data SEI message can be defined to, carry the "Z" location of any overlay that should be overlaid over the video such as subtitles. To provide the "Z" information per (language) stream we propose to enumerate the "Z" values for all the subtitles streams provided on the disc.

It will be clear to the skilled person that processing steps such as the rendering of 3D images, or multiplexing steps can be implemented on a wide variety of processing platforms. These processing platforms may range from dedicated circuits and/or semiconductor devices, programmable logic devices, digital signal processors, or even general purpose processors. Likewise combined software and hardware implementations may also be used to advantage.

While the invention has been illustrated and described in detail in the drawings and foregoing description, such illustration and description are to be considered illustrative or exemplary and not restrictive; the invention is not limited to the disclosed embodiments.

TABLE 1 example of a table for storing offset metadata.

```
offset_metadata( ) - Syntax
offset_metadata( ){
  Length
  for(i = 0; i < number_of_playitem; i++){
    number_of_Plane_offsets[i]
    for(j = 0; j < number_of_Plane_offsets[i]; j++){
      PG_Plane_offset_[pts]
      Other fields not relevant 1
      Other fields not relevant n
      is_PG_Offsets
      if(is_PG_Offsets==1_b){
      number_of_Streams[n]
      for(k = 0; k < number_of_Streams[n]
        _id; k++){
          streamIDList[k]
          PG_Plane_"Z" position metadata
          (depth or disparity data)
        }
      }
    }
  }
}
```

TABLE 2 example of a table for storing offset metadata extended with different subtitle "Z" location metadata per stereoscopic multi-angle video segment

```
offset_metadata( ) - Syntax
offset_metadata( ){
  Length
  for(i = 0; i < number_of_playitem; i++){
    number_of_Plane_offsets[i]
    for(j = 0; j < number_of_Plane_offsets[i]; j++){
      PG_Plane_offset_[pts]
      Other fields not relevant 1
      Other fields not relevant n
      is_PG_Offsets
      if(is_PG_Offsets==1_b){
      number_of_Z_values
      for(k = 0; k < number_of_Z_values
        k++){
          number_of_streams
          number_of_angles
          For (int m=0; m<number_of_streams; m++) {
            StreamID;
          }
          For (int o=0; o<number_of_angles; o++) {
            angleID;
          }
          PG_Plane_"Z" position metadata
          (depth or disparity data)
        }
      }
    }
  }
}
```

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of creating a three-dimensional video signal on a display, the method performed by a processor comprising acts of:
   receiving a first video component comprising first images;
   receiving a second video component comprising second images, with respective ones of the first and second images representing stereo pairs for a three-dimensional video;
   receiving a first text component and a second text component, the first text component comprising text-based subtitles and the second text component comprising presentation graphics-based bitmap images for including in the three-dimensional video;
   receiving a shared Z-location component in the three-dimensional video signal in packets embedded in an elementary stream of audio-visual content, the packets carrying parameters for decoding the content and comprising shared Z-location information describing a depth position within the three-dimensional video that is shared by both the text-based subtitles and the presentation graphics-based bitmap images of respectively the first and second text components using one of depth and disparity values; and
   creating a three-dimensional video signal for display of a three-dimensional image on the display for a duration, the three-dimensional video signal comprising the first video component, the second video component and the first and second text components in accordance with the shared Z-location information for both the text-based subtitles and the presentation graphics-based bitmap images for the duration of the three-dimensional video signal.

2. The method of claim 1, wherein the shared Z-location information is comprised in the three-dimensional video signal in a table defined as extension data of a list that indicates a sequence of audio-visual content items that together form the presentation of a title.

3. The method of claim 2, wherein the table is an offset metadata table that contains different Z-locations of subtitles for various language streams.

4. The method of claim 2, wherein the list contains items that allow playback of stereoscopic multi-angle video data comprising stereoscopic multi-angle video clips, and respective Z-location information is stored in the table for every stereoscopic multi-angle video clip.

5. The method of claim 1, wherein the table is an offset metadata table that contains different Z-locations for overlay of subtitles for every stereoscopic multi-angle video clip.

6. The method of claim 1, wherein the text-based subtitles are provided in subtitle streams, and the shared Z-location information comprises enumerated Z values for all subtitle streams.

7. The method of claim 1, wherein the shared Z-location information is comprised in the three-dimensional video signal in one of:
   a table defined as a list that indicates a sequence of three dimensional audio-visual content items that together form the presentation of a title; and
   a table in a list that indicates a sequence of audio-visual content items that together form the presentation of a title, the table listing video and graphics streams associated to a respective audio-visual content item, in a particular case per item containing a loop with stream coding information for every text and bitmap subtitle stream.

8. The method of claim 1, wherein the shared Z-location information is comprised in the three-dimensional video signal in one of:
   a file that lists metadata related to a transport stream that contains audio-visual content and subtitle streams, in a particular case the file listing subtitle streams by a packet identifier [PID] and the Z-location information is provided for every PID listing that indicates the PID of a subtitle stream;
   a program information table in a file, the program information table providing a list of elementary streams that together form a presentation of audio-visual content, in a particular case the table provides the Z-location information is provided for every elementary stream that contains subtitle information; and
   a characteristic point information [CPI] table that lists entry points into the audio-visual content for trick play, in a particular case listings of entry points comprising a Z-location parameter that indicates per entry point a location in depth of where to overlay graphics.

9. A method of rendering a non-transitory three-dimensional video signal on a display comprising acts:
   receiving the non-transitory three-dimensional video signal comprising a first video component comprising first images, a second video component comprising second images, with respective ones of the first and second images representing stereo pairs, a first text component comprising text-based subtitles and a second text component comprising presentation graphics-based bitmap images for including in the three-dimensional video, and a shared Z-location component in sign messages that are packets embedded in an elementary stream of audio-visual content, the packets carrying parameters that for decoding the content and comprising Z-location information describing a depth position within the three-dimensional video that is shared by both of the text-based subtitles and the presentation graphics-based bitmap images of respectively the first and second text components using one of depth and disparity values;
   rendering on the display the first video component and the second video component for providing a three-dimensional video for a duration, the rendering including rendering the text-based subtitles and/or presentation graphics-based bitmap images in the three-dimensional video; and
   adjusting the depth position of the text-based subtitles and/or presentation graphics-based bitmap images in a frame accurate manner based on the shared Z-location information shared by the text-based subtitles and the presentation graphics-based bitmap images for the duration of the three-dimensional video.

10. A device for creating a non-transitory three-dimensional video signal comprising:
a receiver configured to receive a first video component comprising first images, a second video component comprising second images, respective first images and corresponding second images representing stereo pairs, a first text component comprising text-based subtitles and a second text component comprising presentation graphics-based bitmap images for including in a three-dimensional video for a duration, and a shared Z-location component in sign messages that are packets embedded in an elementary stream of audio-visual content, the packets carrying parameters that for decoding the content and comprising shared Z-location information describing a depth position within the three-dimensional video that is shared by the text-based subtitles and the presentation graphics based bitmap images of respectively the first and second text components using one of depth and disparity values; and
a multiplexer configured to create the non-transitory three-dimensional video signal comprising the first video component, the second video component, the text component, and the shared Z-location information that is shared by the text-based subtitles and the presentation graphics-based bitmap image for the duration of the three-dimensional video.

11. A device for rendering a non-transitory three-dimensional video signal comprising:
a receiver configured to receive the non-transitory three-dimensional video signal comprising a first image component comprising first images, a second video component comprising second images, respective first images and corresponding second images representing stereo pairs, a text component comprising text-based subtitles and a second text component comprising presentation graphics-based bitmap images for including in the three-dimensional video, and a shared Z-location component in sign messages that are packets embedded in an elementary stream of audio-visual content, the packets carrying parameters for decoding the content and comprising shared Z-location information describing a depth position within the three-dimensional video that is shared by of the first text component and the second text component using depth or disparity values; and
a renderer configured to render the first video component and the second video component for providing a three-dimensional video for a duration, the rendering including rendering the text-based subtitles and/or presentation graphics-based bitmap images in the three-dimensional video including adjusting the depth position of the text-based subtitles and presentation graphics-based bitmap images in a frame accurate manner based on the shared Z-location information that is shared by the text-based subtitles and the presentation graphics-based bitmap images for the duration of the three-dimensional video.

12. A tangible computer readable medium embodying non-transitory computer instructions for creating a three-dimensional video on the display, the non-transitory computer instructions being operative to cause a processor to perform the method of claim 1.

13. A tangible computer readable medium embodying non-transitory computer instructions for creating a three-dimensional image on the display, the non-transitory computer instructions being operative to cause a processor to perform the method of claim 9.

14. The method of claim 9, wherein the text-based subtitles are provided in subtitle streams, and the shared Z-location information comprises enumerated Z values for all subtitle streams.

15. The device of claim 10, wherein the text-based subtitles are provided in subtitle streams, and the shared Z-location information comprises enumerated Z values for all subtitle streams.

16. The device of claim 11, wherein the text-based subtitles are provided in subtitle streams, and the shared Z-location information comprises enumerated Z values for all subtitle streams.

17. The tangible computer readable medium of claim 12, wherein the text-based subtitles are provided in subtitle streams, and the shared Z-location information comprises enumerated Z values for all subtitle streams.

18. The tangible computer readable medium of claim 13, wherein the text-based subtitles are provided in subtitle streams, and the shared Z-location information comprises enumerated Z values for all subtitle streams.

\* \* \* \* \*